United States Patent [19]

Prosen

[11] Patent Number: 4,681,247

[45] Date of Patent: * Jul. 21, 1987

[54] LOAD SUPPORT PEDESTAL

[76] Inventor: Gildo G. Prosen, 7071 Belden St., San Diego, Calif. 92117

[*] Notice: The portion of the term of this patent subsequent to Nov. 20, 2001 has been disclaimed.

[21] Appl. No.: 843,837

[22] Filed: Mar. 26, 1986

Related U.S. Application Data

[63] Continuation of Ser. No. 655,628, Sep. 28, 1984, abandoned, which is a continuation-in-part of Ser. No. 459,323, Jan. 20, 1983, Pat. No. 4,483,471.

[51] Int. Cl.$^4$ ................................................. B60R 9/00
[52] U.S. Cl. .................................... 224/322; 224/324; 224/329
[58] Field of Search ............... 224/319, 314, 324, 309, 224/322, 329, 320

[56] References Cited

U.S. PATENT DOCUMENTS

| | | | |
|---|---|---|---|
| 2,988,253 | 6/1961 | Menghi | 224/324 X |
| 3,495,750 | 2/1970 | Oliveira | 224/320 |
| 4,245,764 | 1/1981 | Kowalski et al. | 224/324 X |
| 4,278,192 | 7/1981 | Sazegar | 224/319 X |
| 4,396,138 | 8/1983 | Kirschner | 224/324 X |
| 4,483,471 | 11/1984 | Prosen | 224/314 |

FOREIGN PATENT DOCUMENTS

| | | | |
|---|---|---|---|
| 90431 | 12/1967 | France | 224/309 |
| 2477997 | 9/1981 | France | 224/319 |

Primary Examiner—Stephen Marcus
Assistant Examiner—Robert M. Petrik
Attorney, Agent, or Firm—Brezina & Buckingham

[57] ABSTRACT

The invention relates to an automotive cargo carrier utilizing interlocking vertically offset tubular perimeter members and multiple intersecting tension members providing for a substantially rigid, yet resilient structure, and a system for cargo carriage utilizing various interchangeable elements. The load support member was designed for use in conjunction with tubing members and has a universality of application in supporting the tubing members for load carrying purposes and can itself be so positioned when multiple units are positioned upon the tubing members so as to itself contribute to load carrying and retention.

10 Claims, 6 Drawing Figures

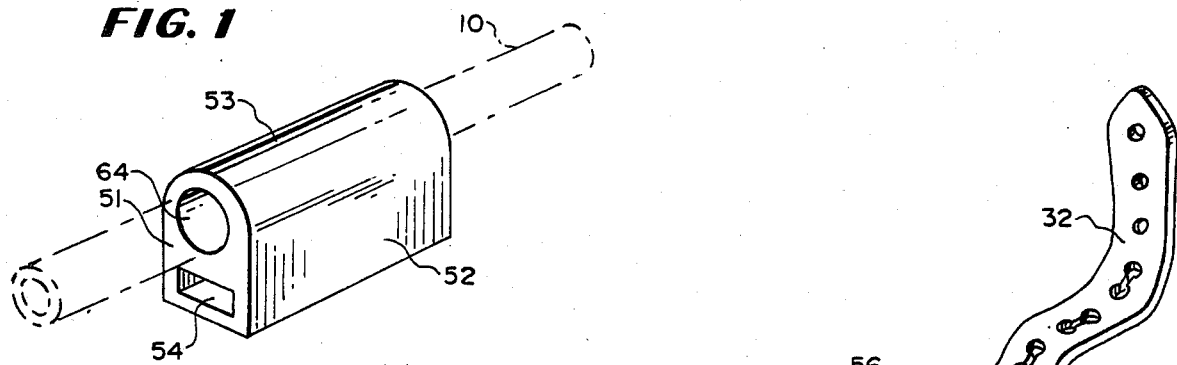
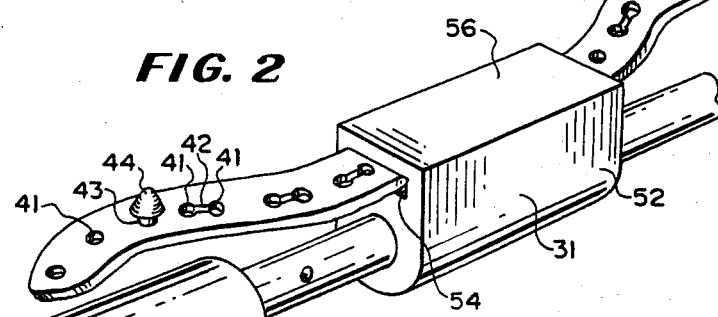
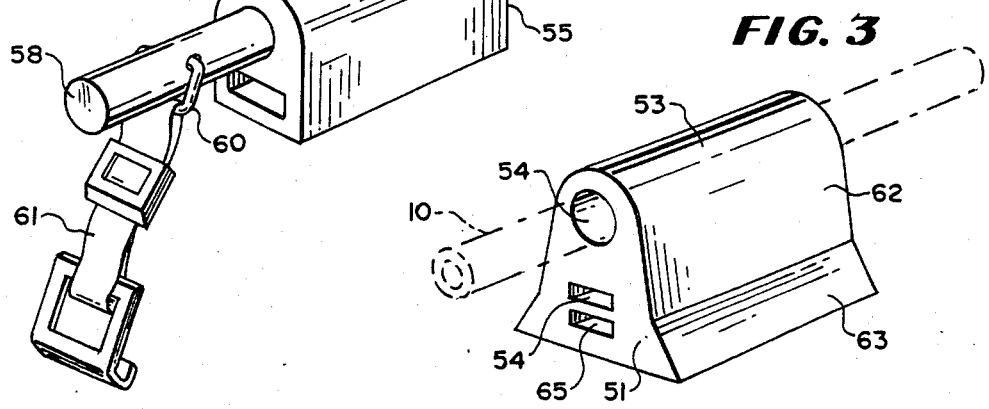
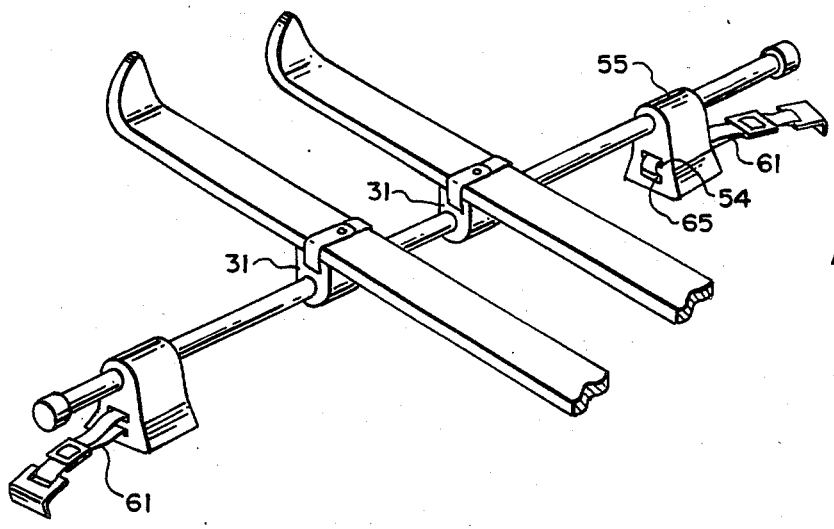

LOAD SUPPORT PEDESTAL

This application is a continuation of application Ser. No. 06/655,628, filed Sept. 28, 1984, now abandoned, which is a continuation in part of my pending application Ser. No. 06/459,323, filed Jan. 20, 1983 now U.S. Pat. No. 4,483,471.

BRIEF DESCRIPTION OF THE DRAWINGS

FIG. 1 is a perspective view of the support pedestal in its tubing support configuration.

FIG. 2 is a perspective view of a pair of support pedestals in their tubing support and load support configurations.

FIG. 3 is a perspective view of the slanted wall support pedestal embodiment.

FIG. 4 is a perspective view of two pairs of support pedestals and a tubing member.

SUMMARY OF THE INVENTION

Figure 5:
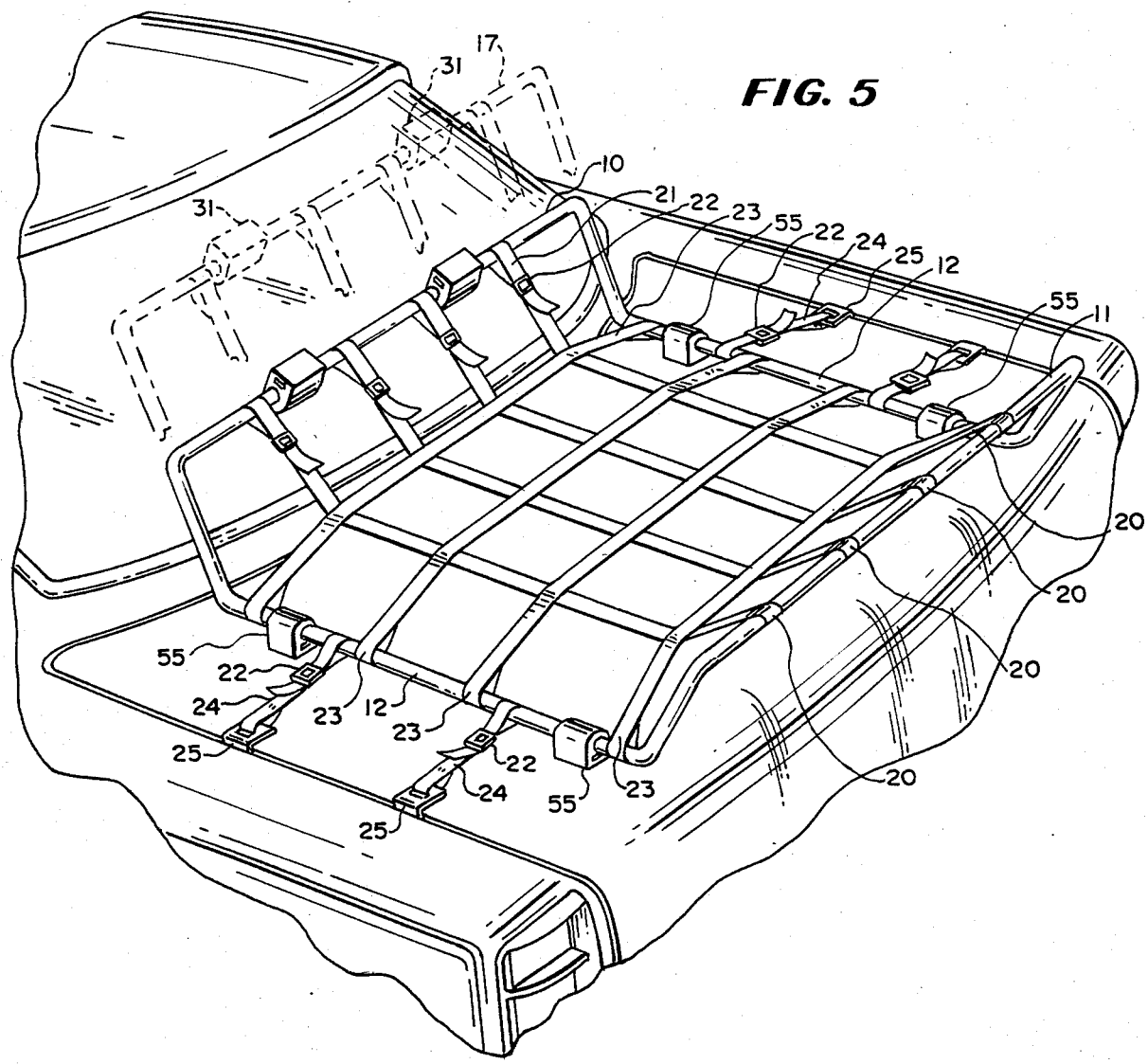
FIG. 5 is a perspective view of a complete cargo carrying system which incorporates my load support pedestal

The invention incorporates numerous features found to be advantageous in the field of the affixation of cargo carrying devices upon automobiles and other vehicles.

One feature of the invention is its use of a series of interlocking tubular members forming a continuous tubular framework. The framework embodies both peripheral and support functions.

The tubular framework further utilizes members which have their axes aligned along a generally rectangular form. The corners of the generally rectangular form are formed through curved bends in the tubing.

The tubular members are further vertically displaced relative to their respective intersecting perpendicular members. This configuration yields a generally rectangular plan form with pairs of horizontal tubes, one pair being vertically displaced upwards from the other pair, each member of which is perpendicularly disposed to the corresponding member.

The invention further features a multiplicity of transverse and longitudinal straps which are flexible, yet resistant to stretching.

The series of straps include longitudinal straps with permanently sewn loops for engagement with the lateral tubular members. The series of straps further incorporates longitudinal straps utilizing loops and adjustable fasteners so that the tension on these sets of straps may be adjusted.

The straps are so arranged such that the straps fixed to the tubular members oriented at the lower portion vertically are bowed upward by the fitment of the adjustable straps mounted on the tubular members which are vertically disposed higher than their corresponding members. This arrangement provides for several advantages.

The utilization of the strap system for tensioning the structure enables assembly and ready disassembly since permanent fastening of the tubular members is unnecessary. This provides for both ease of manufacture and assembly by the user or purchaser, as well as ease of disassembly and storage.

A further advantage provided by the use of straps under tension is that these straps themselves substantially add to the overall strength of the structure as a whole. This addition in strength is substantially greater than would be expected from an untensioned structure utilizing the mere structural strength of the individual elements.

A further advantage provided is that the varaible tension on the strap system enables their use as the load carrying member. It is further contemplated that in certain instances the vertically higher disposed tubular members may themselves be used as load bearing members. The strap system thus permits the utilization of alternative arrangements depending upon the cargo.

Yet another feature is the light weight and ease of mounting of the invention upon the roof, trunk, or other surface of an automobile or other vehicle. The device is mounted through a series of at least four straps utilizing adjustable tension fasteners and engagement members for fastening the structure to various structures utilized in vehicle body panels such as roof gutters, or edges of truck or rear hatch panels. The structure further permits the addition of multiple additional engagement members forwardly and rearwardly oriented to prevent undesirable shift of loads when mounted upon a vehicle.

The ease of reorientation of the engagement means further permits the rotation of the entire structure through approximately 90 degrees, thus reorienting the prior vertically disposed tubular members from a transverse to a longitudinal position relative to the longitudinal center line of the vehicle. This permits carriage of unusual loads directly supported by the webbing, such as sailboats, or rolls of carpeting, or the like. This is particularly suitable where there is a need for accommodating a curved bottom surface such as in the items of cargo mentioned.

The invention further contemplates the use of additional substructures such as mounting pieces for skis incorporating an interior cylindrical section for engagement with the tubular members with external support surfaces and provisions for engagement with separate straps or elastic bands for fastening. Another alternative accessory is the addition of a pair of interconnected, rearwardly extending hooks with support bars extending so as to engage with the substantially vertical rear panel of a vehicle, the basic structure being mounted at or near panel break from the horizontal to the vertical portion, this accessory being used for the carriage of bicycles hung off the rear of the vehicle.

Locking devices formed from suitable rod may be incorporated in such a way as to be readily affixed through mounting on the tubular members, yet provide for secure carriage of various items.

The invention further incorporates the use of elastomeric collars, or sleeves which are fitted over the tubular members which are vertically lower disposed. These sleeves provide several advantages. The sleeves, made of expanded elastomeric material provide for the protection of the finish of the vehicle from the tubular structure of the carrier. The high coefficient of friction of the elastomeric sleeves tends to minimize unwanted shifting of the structure under load. Finally, the thickness of the elastomeric sleeves which themselves support the entire load of the structure permits the structure to be raised above the surface of the vehicle a sufficient distance to accommodate the customary curvature of said surface.

The special purpose, flat-sided mounting sleeves for skis may also be used as general support sleeves when placed on longitudinal sections of the framework.

The load support member was designed for use in conjunction with tubing members and has a universality of application in supporting said tubing members for load carrying purposes and can itself be so positioned when multiple units are positioned upon said tubing members so as to itself contribute to load carrying and retention.

My support pedestal invention constitutes a support pedestal which, in its preferred embodiment, is formed from an elastomeric material. The device is generally boxed shaped having, however, a semi-cylindrical top.

In operation the pedestal can be placed on a section of round tubing acting as an intermediate load bearing member, and when fitted with attachment hooks and used in conjunction with a second support pedestal constitute a load carrying member which may be placed on the roof or deck of a vehicle. Various intermediate load bearing members may be used, such as square tubing, "T" section structural members, extrusions, or the like. When said units comprising a pair of support pedestals, attachment members and tubing are themselves used in pairs an economical, durable, easy to construct yet easy to remove and store, load carrying system results.

The optimum advantage may be obtained by using multiple pairs of the pedestal. In the preferred embodiment said pair of tubing units, each incorporating a pair of tubing support pedestals, can further be fitted with a pair of load support pedestals oriented with their flat base portions 180 degrees opposite the base portions of the tubing support pedestals. When used in this manner the support pedestals can be used to support loads on the tubing members such as skis, surf boards, or the like. Depending on the load to be carried, multiple support pedestals can be oriented so as to increase the surface area which contacts either the deck lid or vehicle roof, or alternatively, the load to be carried itself. In fact, in order to carry maximum loads it is conceivable to alternate base downwardly oriented pedestals with base-upwardly-oriented pedestals throughout the entire length of the intermediate tubing member so as to provide both substantial load bearing propertites and substantial shock absorbing properties resulting from the use of elastomeric pedestals.

In another embodiment of the invention a pair of transverse rectangular section slots may be utilized so that an attachment strap may be passed through, looped around and returned so as to avoid the need for load to be borne on the strap passing underneath the base.

Other features and advantages of the invention will become further apparent.

DISCUSSION OF THE PRIOR ART

There are a number of categories of prior art cargo carriers for vehicles. Generally, these can be either those utilizing permanently mounted fixtures, or removable types. Among these two types certain features overlap and prior art devices are known which utilize permanent mounting of certain fittings and removable engagement of alternative carrier means.

Permanently mounted vehicle cargo carriers generally require the fastening of either brackets or load carrying members themselves, or the like, to a panel on the body of the vehicle. Certain disadvantages of these devices are related to the fastening itself. It is often undesirable for vehicle owners to have holes for bolts or screws put through body panels. Alternative affixation using welding or adhesive each have disadvantages in both disturbance to the finish of the vehicle and certain negative effects to the structural integrity of the panel. A further disadvantage becoming more important recently is that of the undesirable effect on factors such as fuel mileage caused by the placement of aerodynamically inefficient structures in the exposed slipstream of the vehicle. Other disadvantages include the expense of both construction and mounting and the negative aesthetic factor.

Types of cargo carriers are known which utilize certain permanent affixations with removable stanchions or upright members, or other cargo carrying members. This tends to minimize the undesirable aesthetic effect and the detrimental aerodynamic effect; however, these utilize generally more costly manufacturing and affixation processes. These further incorporate all of the undesirable aspects of drilling or fastening into body panels.

A common problem with many types of prior art cargo carriers utilizing any type of fastening means is that of exposure to weather. In particular, exposure to snow, freezing rain, or the like renders many fasteners virtually impossible to disconnect. Collection of lint and dust may cause similar problems. A related problem is that of corrosion which results from most common structural member joining methods, particularly when moisture builds up in joints.

Removable cargo carrying racks generally incorporate the feature of either affixation to certain body structures, such as rain gutters, or those which are resting directly upon the body panel. Each of these has its disadvantages, and other alternative incorporate combinations of the two concepts. Probably the most common cargo carrier for vehicles of a temporary nature is that which utilizes clamps and a structural cross member. When used in pairs, these provide adequate structural support for many loads, such as lumber, ladders, boats, or skis or other relatively long materials. These devices are almost wholly ineffective for the carriage of luggage, or other smaller items. These types of devices further utilize only the structural strength of the cross pieces for support of the load. Apart from the potential problems from a weak cross piece is the substantial problem that the support ultimately is borne by vehicle components not primarily designed for load carrying, namely, the rain gutters. The aesthetic features of these types of cargo carriers are virtually nonexistent, although they do have the advantage of being removable.

Another type of cargo carrier is that which rests directly upon the body panel. These devices are essentially baskets or shelves upon which the cargo rests. In many instances these have greater utility than the rail types previously mentioned; however, these are frequently designed merely for the carriage of smaller items, such as luggage, and are unsuitable for larger loads, such as lumber, boats, or the like. These basket or shelf type carriers rely, for their structural strength, almost wholly upon the inherent structural strength of the individual components from which they are constructed. When constructed of such items as structural steel bars, angles or channels, or structural aluminum, they result in relatively heavy structures for a given load carrying strength. These further are most often permanently assembled and are, therefore, extremely unwieldy and difficult to store. These further have concomitant difficulties in manufacture and transport from the manufacturer to the point of sale. These types of devices are fastened customarily either directly to the vehicle roof rain gutter rails, or alternatively, utilizing support pads and straps, or the like, engaged with body panel edges or the rain gutters of a vehicle. There is a general inflexibility in the use of each of these types.

One final type of a recently developed cargo carrier is the limited special purpose cargo carrier utilizing elastomeric custom made cargo supports and a system of straps for affixation to, e.g., the roof of a vehicle. These devices are of extremely limited utility in that they are especially designed for support of such items as snow skis, or engagement with the gunwales of inverted canoes. These devices, while lightweight and compact, are almost wholly impractical for any other than their specifically designed uses.

Variations of these general types of devices are used in many applications. Bicycle carriers are a common variation, utilizing a multiplicity of legs resting upon pads on a rear deck lid of a vehicle and being engaged, through a series of straps, to the edges of the body panel. The more specialized these types of cargo carriers become, the less their universality in that, e.g., bicycle carriers are very difficult to adapt, or require special adapters for conversion for carrying of other sporting devices such as skis or surfboards. Applicant has a previously pending application dealing with a carrier for supporting paraphernalia. Devices such as the subject of the previous application have limitations in the general carriage of cargo, whether it be lumber, luggage, or the like.

The placement of a strap engagement slot provides substantial advantage in flexibility over the deivce of Oliveira, U.S. Pat. No. 3,495,750.

Oliveiras's intermediate load support member, or tube, utilizes an anchor placed at the end of the tube. It is essential, given the construction of a typical automobile roof and rain gutter assembly, that said anchoring device be placed at a substantial angle from the vertical, inwardly dependent relative to the sides of the passenger compartment of the automobile. This being the case, the placement of the anchor point at the end of the intermediate load bearing tube, limits the length of said tube to substantial distance less than they would of the automobile.

One alternative, given this problem, would be relocate the placement of the anchor point to some point inboard of the intermediate load bearing member. Oliveira fails to contemplate this embodiment, calling for the placement of the anchoring point at the end of the spring assembly, corresponding to the end of the tube. The placement inboard from the end of the tube does have a drawback, however, in that the use of a solid load support member would restrict the placement of the anchor point to some point outboard of the load support member, thereby requiring, particularly on small automobiles, a narrow, relatively unstable load support structure by virtue of the near placement of the two load support members. The placement of a strap engaging opening permits the placement of the strap anchor point either inboard or outboard of the load support member. This permits the use of a finite length tube, or intermediate support member, and permits the variation in position relative to the anchor point of the load bearing member, depending on the width of the roof of the vehicle.

The use of two parallel strap engagement members obviates the problem in location of anchor point completely, in that a strap member may be placed so as to engage the load carrying member directly.

Kowalski, U.S. Pat. No. 4,245,764, utilizes an integral opening for receiving a tie down strap, but is designed for a purpose different than applicant's. Kowalski utilizes specialized brackets of limited flexibility, while applicant has invented a device with broad application in the field, yet having a design suitable for mass production at minimal cost.

DESCRIPTION OF THE PREFERRED EMBODIMENT

The device incorporates essentially a group of four lengths of structural tubing. In the preferred embodiment steel tubing is utilized, but any structural tubing of appropriate strength, such as aluminum or plastic, may be sufficient. Generally four sections of tubing are utilized in the preferred embodiemnt, generally lateral members and longitudinal members. The lateral members, or cross-tubes, are formed through bending into a generally downward section, and thence bent again into a longitudinal section at either end.

It should be noted that the orientation of the tubes and the use of longitudinal tubes is in the customary embodiment, but variations are generally not limited. An important element is the fact that the cross-tubes are manufactured in pairs, one with its longitudinally projecting elements swaged to a reduced diameter slightly less than the inside diameter of the tubing. The other paired cross-tube has its longitudinally projecting ends of a constant diameter. This provides for alternative direct engagement of the two cross-tubes at the user's option. There are certain advantages to this alternative embodiment.

The device has great flexibility in its orientation on the vehicle. Rotation through 90 degrees in a horizontal plane, or rotation through 180 degrees in a vertical plane may be desirable for certain loads. Re-location or addition of supplemental support sleeves and hold down straps readily aids this reorientation.

In the preferred embodiment a second pair of tubes is utilized. The longitudinal tubes incorporate one end swaged to a reduced diameter slightly smaller than the inside diameter of the tubing, while the other is of constant diameter. In this way it is provided so that the four tubes may be engaged to form an essentially continuous length of tubing.

Prior to this engagement, in the initial assembly of the device, the elastomeric load support pedestals are affixed to the longitudinally extending sections of the first pair of tubes. In addition, the looped ends of the longitudinal tensioning straps are also engaged. During the course of assembly the looped ends of the transverse straps are engaged and dispersed approximately equidistant from each other on the longitudinally projecting portions of the cross-tubes and on the longitudinal tubes. The number of transverse straps varies according to the length of the finished cargo carrier, which is itself dependent upon the length of the longitudinal tubing members. In addition, prior to the engagement of the tubing, the looped ends of the fastener ends for the longitudinal straps are engaged with the opposing one of the lateral tubes.

Finally, the loop ends of the fastener straps may also be engaged as desired, depending upon the number and location. As previously noted, where the device is to be disposed upon the rear deck of a vehicle, it is relatively simply to dispose supplementary forwardly located fastening means for engagement with the forward edge of a body panel. Similarly, depending upon the vehicle, there may well be a location for placement of the hooks utilized for engagement with body panels at a suitable location to prevent or minimize forward or rearward displacement of the load. The invention is not limited to any particular location of the engagement hook units, but instead contemplates a great flexibility dependent upon the particular application.

Upon placement of all desired loops for fastening of the necessary straps, the tubing structure may be assembled. As the structural integrity of the assembly is maintained by the straps, it is unnecessary for any adhesives or fasteners to be used to maintain the tubes in position relative to one another at their respective junctions. Assembly is a simple matter of engagement of the reduced diameter ends of the tubes with the standard diameter ends to which they mate. As noted, in various embodiments the size of the resultant load carrying device is essentially contingent upon the length of the longitudinal tubes. For applications in which limited area on the vehicle is available, such as on the rear deck lid of a compact or sports car, the lateral members may be engaged directly to one another at their longitudinally extending portions. On the other hand, where placement of the device is contemplated on a location such as the roof of a station wagon or a van, relatively long longitudinal straps, additional transverse straps, and any necessary engagement hook units are added. In this way an entire system utilizing many common components may be utilized by an owner who, perhaps owns two vehicles, thereby enabling the user to vary the cargo carrying unit to particular applications with minimum substitution of components.

Once engagement of the tubing members has been accomplished, the longitudinal straps are routed beneath each of the transverse straps and tension applied. One critical element in the invention is the use of tensioned straps of a flexible, yet inelastic composition. In the preferred embodiment polypropylene webbing is utilized. Any alternative equivalent strapping could be utilized, however, with the degree of load carrying strength contingent upon the inelasticity of the strapping. The feature of flexibility provides for the conformance of the straps to the load, and for the ready assembly and tensioning of the straps. The degree of inelasticity contributes to a relatively fixed, rigid structure, and support members resistant to a lessening of tension. Through the use of friction fasteners, or buckles, tension can be maintained for long periods. The system of tensional support straps contributes to a structure which is substantially stronger than would be expected through the inherent structural strength of the individual components.

In certain applications it may be desirable to alternate the crossing of the straps, add additional straps, or both.

In distinction to the transverse rail type of cargo carriers, the transverse raised tubing members in the instant structure are under a relatively constant stress, and the use of inelastic strapping more readily distributes stress not only throughout both the lengths of the members themselves, but also to a substantial degree to other parts of the structure. In the event the load is borne by the webbing system itself, a similar structural benefit is provided. As opposed to the prior art utilizing what is, in effect, a basket or shelf, the instant structure utilizes the straps under tension to distribute a load evenly between all of the structural elements, straps and tubing alike.

In addition to the substantial addition to the strength and disperson of unusual localized stresses, the strapping system provides the advantage of maintaining the engaged tubing members in a constant position relative to one another. In this respect the compressive forces of the straps retain the tubing in position, as opposed to other alternative fastening means, such as use of screws or bolts, which merely resist a separating motion. Screws and bolts not only require the placement of engagement holes, which have numerous other structural disadvantages, but localized stresses develop in the event of forces tending to expand the structure. The use of straps further ends to transfer the weight of loads borne by the straps, or borne directly by the lateral tubing members into compressive forces tending to increase the rigidity of the structure at the engagement points of the tubing.

Upon release of the tension on the lateral strapping members, disassembly is readily accomplished. As previously mentioned, the disassembly is of advantage both because of the ready substitutability and change in configuration, as well as ease of reassembly, storage, or for replacement of components in the event they fail or require substitution for other reasons.

Alternative substitute components include elastomeric load support pedestals for the carriage of long, relatively flat items such as skis. These load support pedestals incorporate internal cylindrical openings for engagement with the tubes, while on their exterior are substantially flat along one side. Incorporated in this flat side are embedded straps, or in the preferred embodiment the placement of one or two rectangular section transverse slots for the placement of straps which may be used as hold downs for the items carried. These straps may be of varied construction, using either elasticity or tensioning fasteners to hold the items carried.

The invention contemplates the use of elastic load retention straps which may be engaged with the flat-sided sleeves, or directly with the load carrying device. These straps incorporate primarily three elements. The elements are the elastic strap, the fastener, and fastener engagement openings. The preferred embodiment of these load retainer straps utilizes the elastic properties of the strap to hold the load in close relation to the load carrying device, to absorb vibration, and to provide ease of attachment, maintenance of the attached position, and ease of removal.

These last features are accomplished through the special relation between the configuration of the opening and the elastic properties of the strap. The openings comprise two circular apertures interconnected by a slot. Upon the application of linear tension along the strap the elastic properties result in the elongation of the apertures and the lateral distension of the walls of the slot, thereby permitting ease of engagement of the projecting fastener with the near aperture, sliding through the slit to the far aperture. Upon release of the tension the walls of the slit close to immediately proximate placement relative to each other, thereby preventing inadvertent release. The elastic properties further permit ready release.

These flat sided mounting load support pedestals may also be used to supplement or substitute for the generally cylindrical support sleeves. The placement of the flat sided load support pedestals on the lower tubular members and rotation so the flat surface provides a greater surface area, maximizing the coefficient of friction and distributing the load over a larger surface area.

As set forth further herein, these configurations for load support pedestals provide numerous advantages. The side wall and semi-cylindrical top configuration promotes ease of manufacture and durability. The end wall and transverse rectangular section slots(s) configuration provides for great flexibility in the orientation of the load support pedestal for various purposes. One purpose is the direct load supporting orientation, with the flat base generally upward and toward the load to be carried. Another purpose is the tubing support orientation wherein the load support pedestal is used to support tubing which is itself part of a structure or device on which the load is borne, either directly or indirectly. These tubing structures or devices may include the rectangular perimeter strap tensioned cargo carrier disclosed herein, and in application Ser. No. 06/459,323, now U.S. Pat. No. 4,483,471, or a simple length of tubing used in conjunction with direct load support oriented pedestals.

One further notable feature developed in the reduction to practice of the invention is the design of a particular engagement hook. In the preferred embodiment, the hook used for engagement with vehicle body panels is constructed of an essentially stamped metal sheet configuration. This includes both an opening for engagement with the strap, and a flat hook portion providing for uniform distribution of the forces along as wide a dimension as possible on the body panel edge, or other engagement portion on the vehicle.

An alternative feature particularly useful as an accessory or a supplemental portion of the invention, is the construction of panel engagement hooks from formed rod. The formed rod is constructed in such a way as to have an engagement loop for engagement in the strap with a flat portion, and opposite the flat portion forwardly extending projections thence extended downward into forming a hook. The pair of forwardly extending projections, since they are formed from a rod, necessarily have a space between them which may be formed of a sufficient dimension to permit the addition or removal of this hook from a permanently sewn loop in the strap. This permits a multiple use from permanently sewn straps in that, given the alternative, they may be engaged directly on the tubing members without the permanent placement of a hook thereon. If, in an alternative embodiment an additional strap is necessary, for example to prevent load shifting forwardly or rearwardly, the strap may be utilized for a second purpose by the mere placement of the alternative embodiment's engagement hook thereon.

DETAILED DESCRIPTION OF THE DRAWINGS

FIG. 1 is a perspective view of the preferred embodiment of the load support pedestal in its intermediate tubing support orientation. The intermediate tube 10 is shown in phantom lines in relation to the tubing engagement opening 64. The pedestal has upstanding end walls 51 at right angles to the side walls 52. The upstanding side walls 52 merge into a semi-cylindrical top portion 53 so as to form a continuous surface extending from one side adjacent to the base merging through the semi-cylindrical section into the second side wall, thence to its joinder with the base. Located above the base is a transverse, rectangular section slot 54 which extends from one end wall through to the opposite end wall.

FIG. 2 shows the support pedestal in two orientations, the load support orientation 31, in which the load is borne directly by the pedestal, and the tubing support orientation 55, in which the pedestal supports an intermediate tube which in turn supports either the load directly or a pedestal oriented for direct load support. The load support pedestal's rectangular base 56 is apparent in this view. The tubing support pedestal 31 engages an elastic load retention strap, 32, in which the apertures, 41, slit, 42, and generally cylindrical fastener 43 having a conical head 44 are apparent, passes through the rectangular section slot 54. Further apparent is the intermediate tube 10 which terminates in a butt end 58. This figure shows one method of utilization of the pedestal. The pedestal 55 is placed on a section of round tubing 10, said tubing being fitted with attachment points 60 and a strap assembly 61 for attachment to a vehicle. This is used in conjunction with the support pedestal 31 which constitutes a load carrying member on which the cargo bears directly. This assembly, when placed in pairs on a tube may be placed on the roof or deck of a vehicle.

FIG. 3 is a perspective view which shows another embodiment which incorporates angled side walls 62 and 63, a tubing engagement opening 64 and two rectangular section slots extending through the entirety of the otherwise solid pedestal. The first opening 54 corresponds to the cylindrical opening located near the semi-cylindrical top section 53 and extending parallel to said top section through the body from one end wall 51 to another. The first transverse rectangular section slot corresponds to the single transverse rectangular section slot in the embodiment previously described. The second transverse slot 65 is also a rectangular section slot similar to rectangular section slot 54 and located adjacent to the base of the load support pedestal.

FIG. 4 shows two pairs of support pedestals 31 and 55, and attachment strap assemblies used in pairs. The double transverse rectangular section slot configuration permits the attachment strap 61 to be passed through the lower rectangular opening 65, looped around and returned through the upper opening 54 so as to avoid the need for separate attachment points on the tubing, as in FIG. 2, or for the mass of the load to be borne on the strap passing underneath the base, should the attachment strap be passed through a single rectangular section opening and underneath the load support pedestal.

Figure 6:
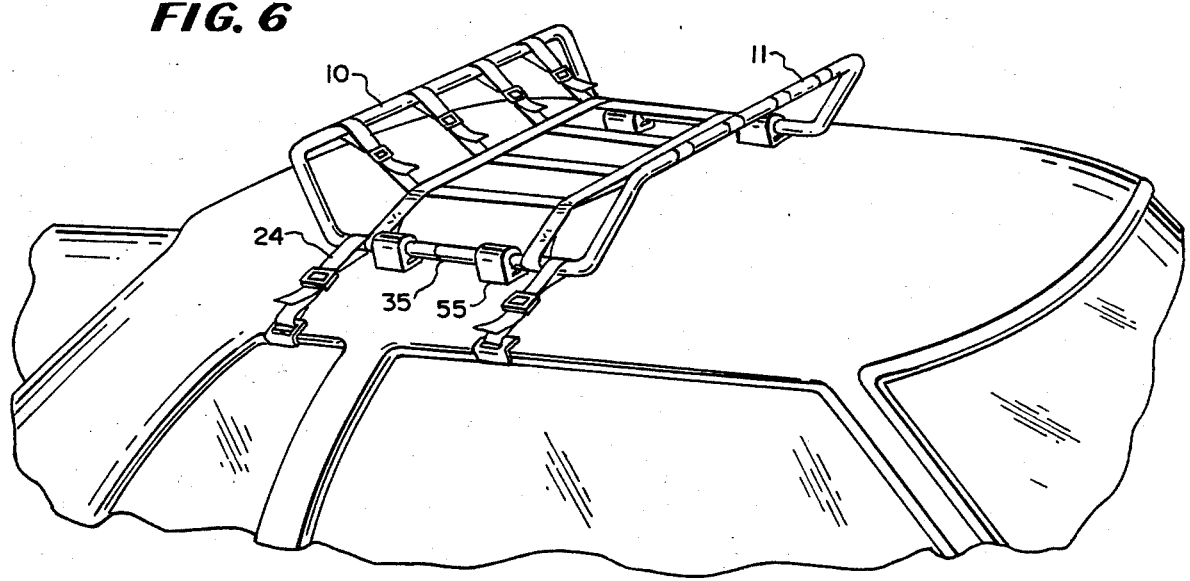
FIG. 6 is a perspective view of another complete cargo carrying system which incorporates my load support pedestal

FIG. 5 constitutes a perspective view of the invention, incorporated in a complete cargo carrying unit installed on a vehicle. Apparent in FIG. 5 is the narrowed engagement section cross-tube, 10, the straight diameter cross-tube, 11, and the longitudinal tubes, 12. A larger scale cut-away view of the intersection of the tubes is indicated and displayed in FIG. 6 below. Various other elements of the preferred embodiment are apparent in FIG. 5. The longitudinal straps, 20, which are in this view fastened to the looped ends of the fastener straps, 21, at the fasteners, 22. The longitudinal straps pass underneath the transverse straps, 23. In this embodiment hold down straps, 24, also incorporating fasteners, 22, are run through hooks 25, for engagement with automobile body panels. Further apparent are the elastomeric load support pedestals, 55, in this embodiment placed on the longitudinal projecting legs of the cross-tubes.

An alternative configuration is shown in FIG. 5, in dashed lines utilizing alternative placement of the elastomeric load support pedestals, in their load carrying orientation 31, here adapted for carrying skis, or other substantially flat items or materials. A further optional accessory is a vertically displaced narrowed engagement section cross-tube, 17, which provides for the raising of one end of a long load so as to provide clearance, for example, over the roof line of a vehicle, when the device is placed upon the rear deck of the vehicle.

In accordance with my invention, I claim:

1. A load carrying system adapted for attachment to a vehicle by straps under tension, having a support member with a transverse opening slidingly receiving an intermediate load-bearing tube, said support member having side and end walls, a base and a top opposite said base, the improvement comprising, in combination:

said intermediate load bearing tube having a round cross-section, and engaging at least two of said load support members;

said intermediate load bearing tube adapted for carriage of a load borne thereon;

said bases of said load support members engaging a body panel of said vehicle;

said load support member having an elastomeric body in which there is a transverse opening of circular section, said transverse opening rotatably engaging said intermediate tube and said elastomeric body, said load support member incorporating a base of a width equal to a dimension of the distance from the center of said transverse opening to the point at which said load supporting surface intersects with the side walls of said load support member, said load supporting member having end walls adjacent to said side walls and a semi-cylindrical top surface joining said side walls and surrounding said transverse opening said tube engaging at least one additional load supporting member adapted to directly support loads borne by the system, having a transverse opening slidably and rotatably engaging the intermediate load bearing tube, having side and end walls, a base and a top opposite said base, said load support member having at least one rectangular section slot of width equivalent to the diameter of said transverse opening, in an elastomeric body.

2. In the system as set forth in claim 1;

said top comprising a semi-cylindrical surface surrounding and oriented parallel to said transverse opening, said second load support member having said semi-cylindrical surface merging into substantially parallel sidewalls intersecting a load bearing base surface at a point such that the distance from the intersection point to the axis of said transverse opening is equal to the width of said additional load supporting surface and said additional load supporting member engaging an attachment 3. A load carrying system adapted for attachment to a vehicle by straps under tension, having a support member with a transverse opening slidingly receiving an intermediate load-bearing tube, said support member having side and end walls, a base and a top opposite said base, the improvement comprising, in combination:

said intermediate load bearing tube having a round cross-section, and engaging at least two of said load support members;

said intermediate load bearing tube adapted for carriage of a load borne thereon;

said bases of said load support members engaging a body panel of said vehicle;

said load support member having an elastomeric body in which there is a transverse opening of circular section, said transverse opening rotatably engaging said intermediate tube and said elastomeric body having at least one rectangular section slot parallel to said transverse opening, said load support member incorporating a base of a width equal to a dimension of the distance from the center of said transverse opening to the point at which said load supporting surface intersects with the side walls of said load support member, said load supporting member having end walls adjacent to said side walls and a semi-cylindrical top surface joining said side walls and surrounding said transverse opening said tube engaging at least one additional load supporting member adapted to directly support loads borne by the system, having a transverse opening slidably and rotatably engaging the intermediate load bearing tube, having side and end walls, a base and a top opposite said base, said load support member having at least one rectangular section slot of width equivalent to the diameter of said transverse opening, in an elastomeric body.

4. In the system as set forth in claim 3;

said top comprising a semi-cylindrical surface surrounding and oriented parallel to said transverse opening, said second load support member having said semi-cylindrical surface merging into substantially non-parallel sidewalls extending outward from the axis of said transverse opening, said outwardly extending sidewalls intersecting a load bearing base surface at a point such that the distance from the intersection point to the axis of said transverse opening is equal to the width of said load supporting surface.

5. A load carrying system adapted for attachment to a vehicle by straps under tension, having a support member with a transverse opening slidingly receiving an intermediate load-bearing tube, said support member having side and end walls, a base and a top opposite said base, the improvement comprising, in combination:

said intermediate load bearing tube having a round cross-section, and engaging at least two of said load support members;

said intermediate load bearing tube adapted for carriage of a load borne thereon;

said bases of said load support members engaging a body panel of said vehicle;

said load support member having an elastomeric body in which there is a transverse opening of circular section, said transverse opening rotatably engaging said intermediate tube and said elastomeric body, said load support member incorporating a base of a width equal to a dimension of the distance from the center of said transverse opening to the point at which said load supporting surface intersects with the side walls of said load support member, said load supporting member having end walls adjacent to said side walls and a semi-cylindrical top surface joining said side walls and surrounding said transverse opening said semi-cylindrical top surface surrounding and oriented parallel to said transverse opening, said load support member having a said semi-cylindrical surface merging into substantially parallel sidewalls intersecting a load bearing base surface at a point such that the distance from the intersection point to the axis of said transverse opening is equal to the width of said load supporting surface said tube engaging at least one additional load supporting member adapted to directly support loads borne by the system, having a transverse opening slidably and rotatably engaging the intermediate load bearing tube, having side and end walls, a base and a top opposite said base, said load support member having at least one rectangular section slot of width equivalent to the diameter of said transverse opening, in an elastomeric body.

6. In the system as set forth in claim 5;

said top comprising a semi-cylindrical surface surrounding and oriented parallel to said transverse opening, said second load support member having said semi-cylindrical surface merging into substantially parallel sidewalls intersecting a load bearing base surface at a point such that the distance from the intersection point to the axis of said transverse opening is equal to the width of said additional load supporting surface and said additional load supporting member engaging an attachment strap system.

7. A load carrying system adapted for attachment to a vehicle by straps under tension, having a support member with a transverse opening slidingly receiving an intermediate load-bearing tube, said support member having side and end walls, a base and a top opposite said base, the improvement comprising, in combination:

said intermediate load bearing tube having a round cross-section, and engaging at least two of said load support members;

said intermediate load bearing tube adapted for carriage of a load borne thereon;

said bases of said load support members engaging a body panel of said vehicle;

said load support member having an elastomeric body in which there is a transverse opening of circular section, said transverse opening rotatably engaging said intermediate tube and said elastomeric body, said load support member incorporating a base of a width equal to a dimension of the distance from the center of said transverse opening to the point at which said load supporting surface intersects with the side walls of said load support member, said load supporting member having end walls adjacent to said side walls and a semi-cylindrical top surface joining said side walls and surrounding said transverse opening said semi-cylindrical top surface surrounding and oriented parallel to said transverse opening, said semi-cylindrical surface merging into non-parallel sidewalls extending outward from the axis of said transverse opening, said outwardly extending sidewalls intersecting a load bearing base surface at a point such that the distance from the intersection point to the axis of said transverse opening is equal to the width of said load supporting surface said tube engaging at least one additional load supporting member adapted to directly support loads borne by the system, having a transverse opening slidably and rotatably engaging the intermediate load bearing tube, having side and end walls, a base and a top opposite said base, said load support member having at least one rectangular section slot of width equivalent to the diameter of said transverse opening, in an elastomeric body.

8. In the system as set forth in claim 7, said top comprising a semi-cylindrical surface surrounding and oriented parallel to said transverse opening, said second load support member having said semi-cylindrical surface merging into substantially non-parallel sidewalls extending outward from the axis of said transverse opening, said outwardly extending sidewalls intersecting a load bearing base surface at a point such that the distance from the intersection point to the axis of said transverse opening is equal to the width of said load supporting surface.

9. A load carrying system adapted for attachment to a vehicle by straps under tension, having a support member with a transverse opening slidingly receiving an intermediate load-bearing tube, said support member having side and end walls, a base and a top opposite said base, the improvement comprising, in combination:

said intermediate load bearing tube having a round cross-section, and engaging at least two of said load support members;

said intermediate load bearing tube adapted for carriage of a load borne thereon;

said bases of said load support members engaging a body panel of said vehicle;

said load support member having an elastomeric body in which there is a transverse opening of circular section, said transverse opening rotatably engaging said intermediate tube and said elastomeric body having at least one rectangular section slot parallel to said transverse opening, said load support member incorporating a base of a width equal to a dimension of the distance from the center of said transverse opening to the point at which said load supporting surface intersects with the side walls of said load support member, said load supporting member having end walls adjacent to said side walls and a semi-cylindrical top surface joining said side walls and surrounding said transverse opening in which the system utilizes at least two of said intermediate tubing members comprising elements of a load carrying structure in which said tubes are support elements for load carrying and are oriented in substantially parallel relation to one another.

10. A load carrying system adapted for attachment to a vehicle by straps under tension, having a support member with a transverse opening slidably receiving an intermediate load-bearing tube, said support member having side and end walls, a base and a top opposite said base, the improvement comprising, in combination:

said intermediate load bearing tube having a round cross-section, and engaging at least two of said load support members;

said intermediate load bearing tube adapted for carriage of a load borne thereon;

said bases of said load support members engaging a body panel of said vehicle;

said load support member having an elastomeric body in which there is a transverse opening of circular section, said transverse opening rotatably engaging said intermediate tube and said elastomeric body, said load support member incorporating a base of a width equal to a dimension of the distance from the center of said transverse opening to the point at which said load supporting surface intersects with the side walls of said load support member, said load supporting member having end walls adjacent to said side walls and a semi-cylindrical top surface joining said side walls and surrounding said transverse opening said semi-cylindrical top surface surrounding and oriented parallel to said transverse opening, said semi-cylindrical surface merging into non-parallel sidewalls extending outward from the axis of said transverse opening, said outwardly extending sidewalls intersecting a load bearing base surface at a point such that the distance from the intersection point to the axis of said transverse opening is equal to the width of said load supporting surface in which the system utilizes at least two of said intermediate tubing members comprising elements of a load carrying structure in which said tubes are support elements for load carrying and are oriented in substantially parallel relation to one another.

* * * * *